United States Patent
Shimoyamada et al.

(10) Patent No.: US 10,594,761 B2
(45) Date of Patent: Mar. 17, 2020

(54) INFORMATION PROCESSING SYSTEM, INFORMATION PROCESSING APPARATUS, INFORMATION PROCESSING METHOD, NON-TRANSITORY COMPUTER-READABLE STORAGE MEDIUM, AND SERVER SYSTEM

(71) Applicant: NINTENDO CO., LTD., Kyoto (JP)

(72) Inventors: Teruyuki Shimoyamada, Tokyo (JP); Toru Nagihashi, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 1015 days.

(21) Appl. No.: 13/793,698

(22) Filed: Mar. 11, 2013

(65) Prior Publication Data
US 2013/0282861 A1    Oct. 24, 2013

(30) Foreign Application Priority Data
Apr. 20, 2012   (JP) .................. 2012-096847

(51) Int. Cl.
*H04L 29/08* (2006.01)
*H04L 29/06* (2006.01)

(52) U.S. Cl.
CPC ............ *H04L 67/02* (2013.01); *H04L 67/306* (2013.01); *H04L 67/38* (2013.01)

(58) Field of Classification Search
CPC ............ G07F 17/3238; G07F 17/3276; G07F 17/3225; G07F 17/3272; A63F 13/35; A63F 13/79; A63F 13/71; A63F 13/795; A63F 13/00; A63F 13/2145; A63F 13/352; A63F 13/54; A63F 13/77; A63F 13/822; H04L 67/38; H04L 65/605; H04L 65/4076; H04L 65/403; H04L 65/607; H04L 65/608; H04L 65/80; H04L 67/42; H04L 65/4007; H04L 65/4015; H04L 65/00; H04L 65/1069; H04L 67/025; H04L 67/10; H04L 47/25; H04L 51/046; H04L 12/66;
(Continued)

(56) References Cited

U.S. PATENT DOCUMENTS 6,419,577 B1 * 7/2002 Okada et al. ............... 463/1
2002/0143867 A1 * 10/2002 Horikawa ............. 709/203
(Continued)

FOREIGN PATENT DOCUMENTS

JP    2007-206823    8/2007

OTHER PUBLICATIONS

White Knight Chronicles—Awakening of Light and Darkness—official complete guide, Enterbrain Inc., Oct. 8, 2010, first edition, pp. 11, 116 with partial English translation (7 pages).
(Continued)

*Primary Examiner* — Djenane M Bayard
(74) *Attorney, Agent, or Firm* — Nixon & Vanderhye PC

(57) ABSTRACT

An application execution section executes an application that is executable without communicating with a server system. An other user information obtaining section obtains, from the server system, information of another user who has accessed disclosed information of a user of an information processing system, which disclosed information is present on the server system. The application execution section adds a change to execution of the application, based on the information of the another user which is obtained by the other user information obtaining section.

21 Claims, 11 Drawing Sheets

(58) Field of Classification Search
CPC . H04L 29/06034; H04L 47/283; H04L 51/14; H04L 65/602; H04L 67/1097; H04L 67/18; H04L 67/24; H04L 67/2861; H04L 51/32; H04L 63/08; H04L 63/12; H04L 65/604; H04L 67/22; H04L 67/26; H04L 12/1822; H04L 65/601; H04L 67/34; H04L 2209/38; H04L 2209/56; H04L 2209/80; H04L 63/00; H04L 65/4084; H04L 67/36; H04L 9/0637; H04L 9/3239
See application file for complete search history.

(56) References Cited

U.S. PATENT DOCUMENTS

| | | | | |
|---|---|---|---|---|
| 2003/0224856 | A1* | 12/2003 | Bukovsky | A63F 13/12 463/42 |
| 2005/0282635 | A1* | 12/2005 | Aoki | A63F 13/12 463/42 |
| 2007/0087827 | A1* | 4/2007 | Hirota | A63F 13/10 463/40 |
| 2008/0146338 | A1* | 6/2008 | Bernard | A63F 13/00 463/42 |
| 2008/0221998 | A1* | 9/2008 | Mendelsohn | G06Q 30/02 705/14.12 |
| 2010/0105481 | A2* | 4/2010 | Hogan | A63F 13/12 463/42 |
| 2010/0227685 | A1* | 9/2010 | Mori | 463/30 |
| 2011/0124415 | A1* | 5/2011 | Shimono | A63F 13/92 463/42 |
| 2011/0202605 | A1* | 8/2011 | Shochet | H04L 51/04 709/205 |
| 2011/0263333 | A1* | 10/2011 | Dokei | A63F 13/12 463/42 |
| 2013/0274001 | A1* | 10/2013 | de Jesus | A63F 13/12 463/25 |
| 2013/0288800 | A1* | 10/2013 | Takushima | 463/42 |
| 2015/0227296 | A1* | 8/2015 | Pringle | G06F 3/0481 715/760 |

OTHER PUBLICATIONS

"Game Synchronized website, Ace Combat Assault Horizon", http://ah.acecombat.jp/game_web/index.htlm , and English translation, 6 pages.

"Game Synchronized website, Ace Combat Assault Horizon", http://ah.acecombat.jp/game_web/index.html, and English translation, 6 pages.

* cited by examiner

INFORMATION PROCESSING SYSTEM, INFORMATION PROCESSING APPARATUS, INFORMATION PROCESSING METHOD, NON-TRANSITORY COMPUTER-READABLE STORAGE MEDIUM, AND SERVER SYSTEM

CROSS REFERENCE TO RELATED APPLICATION

The disclosure of Japanese Patent Application No. 2012-096847, filed on Apr. 20, 2012, is incorporated herein by reference.

FIELD

The technology disclosed herein relates to an information processing system, an information processing apparatus, an information processing method, a non-transitory computer-readable storage medium, and a server system.

BACKGROUND AND SUMMARY

Conventionally, a system has been known in which a game executed by a game apparatus or the like and a web site on the Internet are linked with each other.

A main object of the present technology is to provide an information processing system, an information processing apparatus, an information processing method, a non-transitory computer-readable storage medium, and a server system, which are capable of adding a change to execution of an application, based on information of another user who has accessed disclosed information.

The above object is achieved by configuration examples as follows.

A first configuration example is an information processing system including: an application execution section configured to execute an application which is executable without communicating with a server system; and an other user information obtaining section configured to obtain, from the server system, information of another user who has accessed disclosed information of a user of the information processing system, the disclosed information being present on the server system. The application execution section adds a change to the execution of the application, based on the information of the another user which is obtained by the other user information obtaining section.

The "application which is executable without communicating with a server system" is an application which need not necessarily communicate with the server system when executing the application. That is, it is an application designed so as to achieve a major purpose of the application even if communication with the server system is not performed at all. Accordingly, an application which communicates with the server system for a secondary purpose, such as "upload of player information" or "download of other player information" in an embodiment described later, is not excluded.

The information processing system may further include an association section which associates a user of an application executed by the application execution section with the user who provides the disclosed information on the server system.

The information processing system may further include a user identification code display section which displays a user identification code for identifying the user of the application executed by the application execution section. The association section may cause the user to input the user identification code displayed by the user identification code display section, and may transmit the user identification code to the server system.

The obtainment of the information of the another user by the other user information obtaining section may be performed during the execution of the application by the application execution section. Therefore, a change according to the information of the another user can be added in the state where the application is being executed.

The application execution section may display an object corresponding to the another user, based on the information of the another user which is obtained by the other user information obtaining section. Thereby, the user's interest can be enhanced.

The server system may store, for each of users of information processing systems, disclosed information of the user and information of another user who has accessed the disclosed information. Thereby, a change can be added to the execution of the application, for each user.

The information of the another user obtained by the other user information obtaining section may include at least one of information for identifying the another user, and information for identifying an object (e.g., a virtual creature described later) owned by the another user.

The information processing system may further include an access section which accesses the disclosed information of the user of the information processing system and the disclosed information of the another user, each disclosed information being present on the server system, and displays the disclosed information.

The information processing system may include a first information processing apparatus and a second information processing apparatus, the application execution section and the other user information obtaining section may be included in the first information processing apparatus, and the access section may be included in the second information processing apparatus. Thereby, even when the information processing apparatus that executes an application is different from the information processing apparatus that accesses disclosed information, a change can be added to execution of the application, based on information of another user who has accessed the disclosed information.

A second configuration example is an information processing apparatus including: an application execution section configured to execute an application that is executable without communicating with a server system; and an other user information obtaining section configured to obtain, from the server system, information of another user who has accessed disclosed information of a user of the information processing apparatus, the disclosed information being present on the server system. The application execution section adds a change to the execution of the application, based on the information of the another user which is obtained by the other user information obtaining section.

A third configuration example is an information processing method in an information processing system. The information processing method includes: executing an application that is executable without communicating with a server system; and executing an other user information obtaining process of obtaining, from the server system, information of another user who has accessed disclosed information of a user of the information processing system, the disclosed information being present on the server system. In the execution of the application, a change is added to the execution of the application, based on the information of the another user obtained in the other user information obtaining process.

A fourth configuration example is a non-transitory computer-readable storage medium having stored therein an information processing program for causing a computer of an information processing system to execute: an application execution process of executing an application that is executable without communicating with a server system; and an other user information obtaining process of obtaining, from the server system, information of another user who has accessed disclosed information of a user of the information processing system, the disclosed information being present on the server system. In the application execution process, a change is added to the execution of the application, based on the information of the another user obtained in the other user information obtaining process.

The information processing program may be stored in any computer-readable storage medium (e.g., a flexible disk, hard disk, optical disc, magneto-optical disc, CD-ROM, CD-R, magnetic tape, semiconductor memory card, ROM, RAM, or the like).

A fifth configuration example is a server system comprising: an disclosed information storage section configured to store disclosed information of each of users; an access information storage section configured to store, for each user's disclosed information, information of another user who has accessed the disclosed information; a disclosure section configured to transmit, in response to a request from an access section included in an information processing system of each user, the disclosed information stored in the disclosed information storage section, to the access section; and a transmission section configured to transmit, in response to a request from an other user information obtaining section included in an information processing system of a user corresponding to any disclosed information stored in the disclosed information storage section, the information of the another user who has accessed the disclosed information of the user, which is stored in the access information storage section, to the other user information obtaining section.

According to the present technology, a change can be added to execution of an application, based on information of another user who has accessed disclosed information.

DETAILED DESCRIPTION OF NON-LIMITING EXAMPLE EMBODIMENTS

Hereinafter, one embodiment of the present technology will be described.

Figure 1:
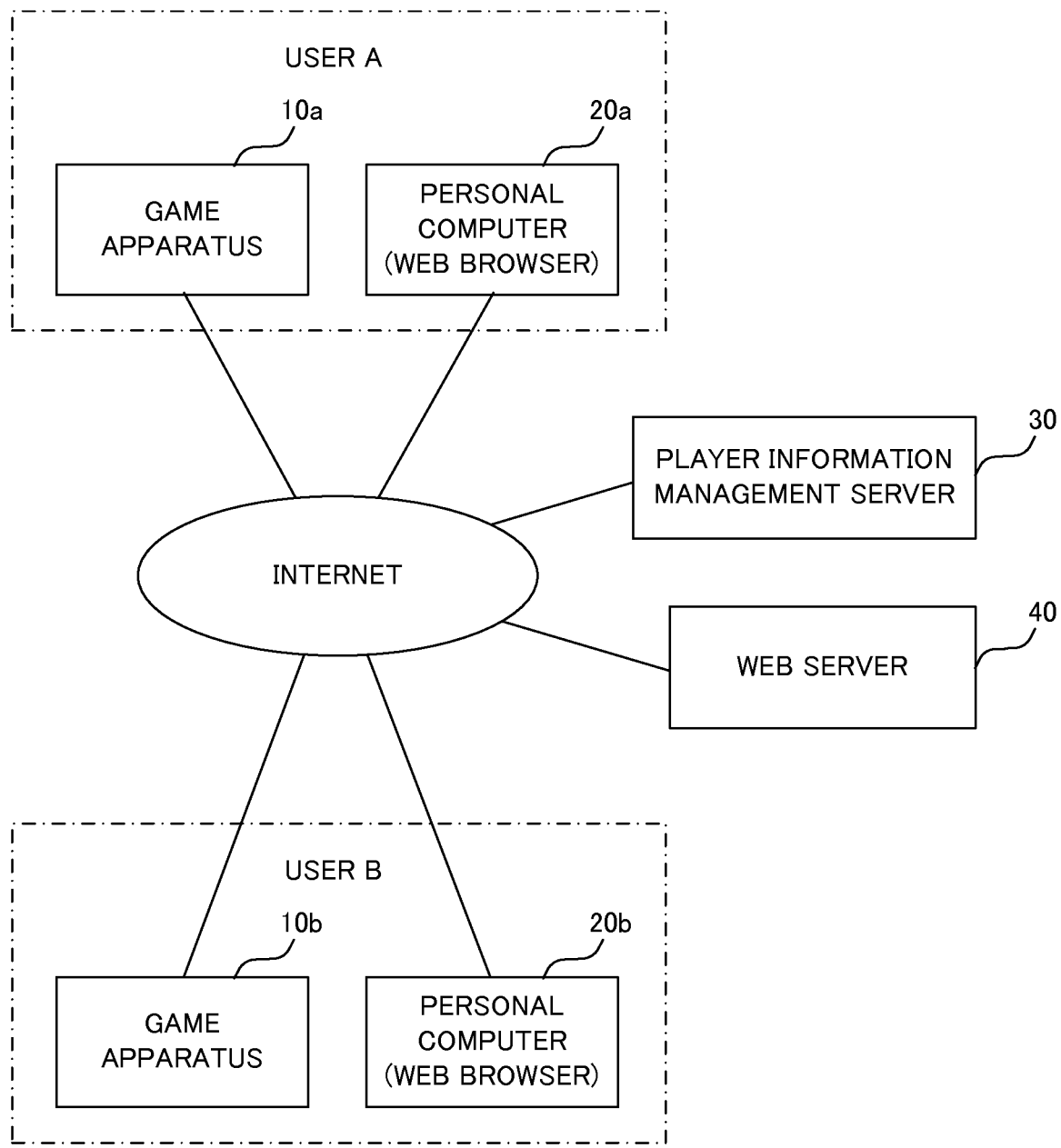
FIG. 1 is a block diagram illustrating a non-limiting example of a configuration of a system in which a game and a website are linked with each other.

In FIG. 1, a game apparatus 10a and a personal computer 20a are owned by a user A. The game apparatus 10a executes a game based on an operation performed by the user A (hereinafter, also referred to as "player A"). The personal computer 20a includes a web browser. Likewise, a game apparatus 10b and a personal computer 20b are owned by a user B. The game apparatus 10b executes a game based on an operation performed by the user B (hereinafter, also referred to as "player B"). The personal computer 20b includes a web browser. In the following description, when the game apparatus 10a and the game apparatus 10b need not be particularly distinguished, they are collectively referred to as "game apparatus 10". Likewise, when the personal computer 20a and the personal computer 20b need not be particularly distinguished, they are collectively referred to as "personal computer 20".

The game apparatus 10 and the personal computer 20 are allowed to access a player information management server 30 and a web server 40 via the Internet.

Next, the outlines of the configuration and operation of the game apparatus 10 will be described.

Figure 2:
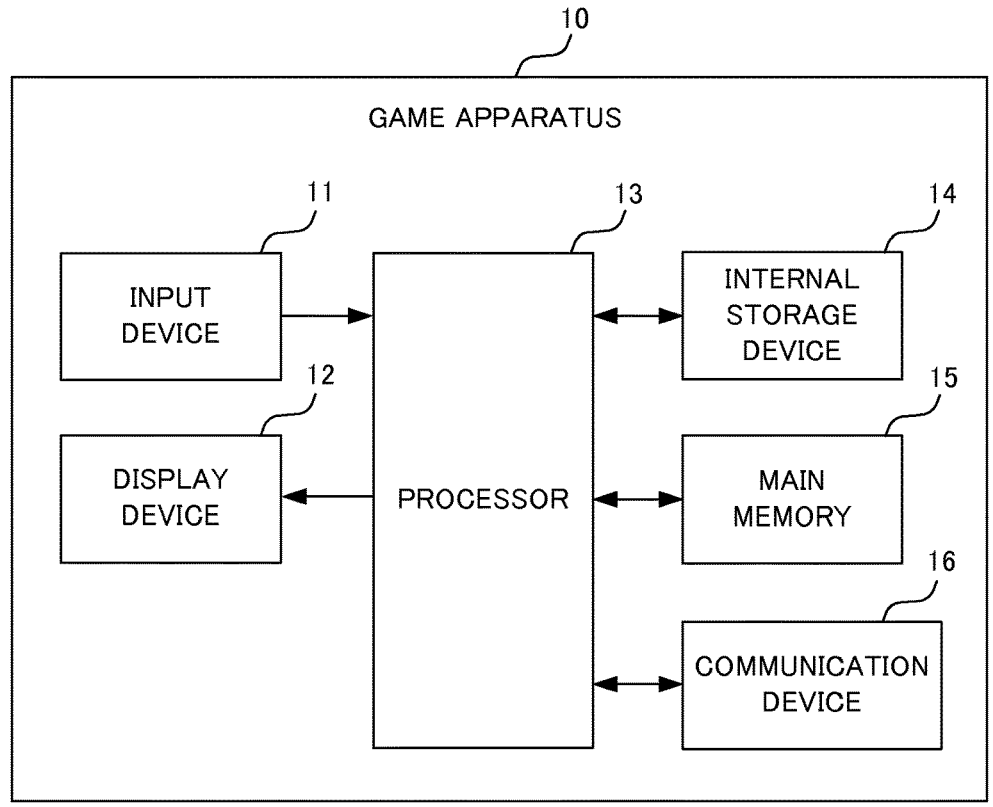
FIG. 2 is a diagram illustrating a non-limiting example of a configuration of a game apparatus.

As shown in FIG. 2, the game apparatus 10 includes an input device 11, a display device 12, a processor 13, an internal storage device 14, a main memory 15, and a communication device 16. The input device 11 is operated by the user of the game apparatus 10, and outputs a signal according to the operation performed by the user. The input device 11 is, for example, a cross switch, a push button, or a touch panel. The display device 12 displays, on a screen, an image generated in the game apparatus 10. The display device 12 is typically a liquid crystal display device. A computer program to be executed by the processor 13 is stored in the internal storage device 14. The internal storage device 14 is typically a flash EEPROM. The main memory 15 temporarily stores a computer program and data. The communication device 16 transmits a signal to another device (e.g., the player information management server 30), and receives a signal from another device (e.g., the player information management server 30 or the web server 40).

Figure 3:
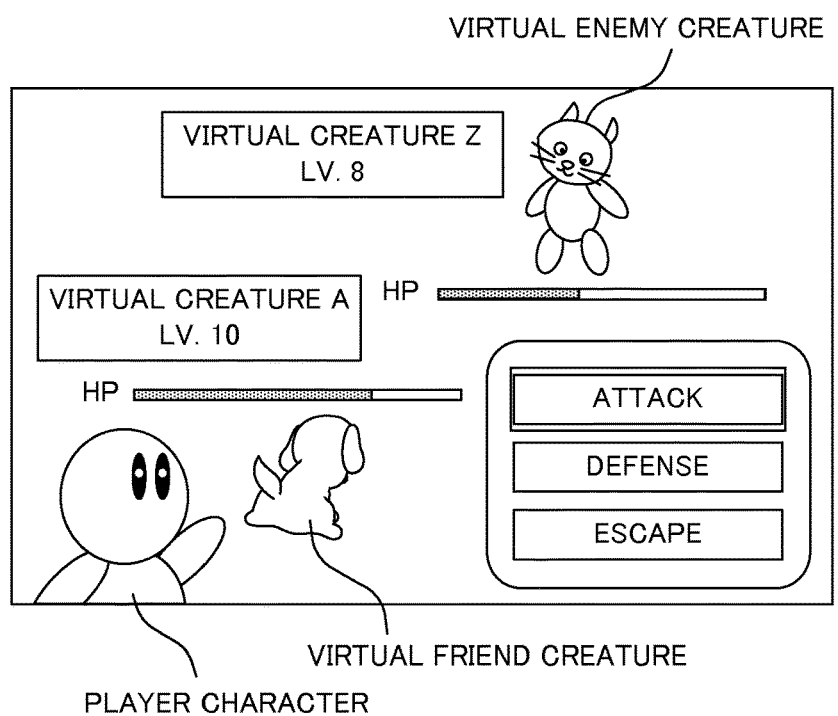
FIG. 3 is a diagram illustrating a non-limiting example of a game image.

The game apparatus 10 executes game processing based on a game program. In the present embodiment, a game is executed in which a player character operated by a player gives a command to a virtual friend creature owned by the player character to cause the virtual friend creature to fight with a virtual enemy creature in a game world. For example, FIG. 3 shows a game image in which a virtual creature A as the virtual friend creature is fighting with a virtual creature Z as the virtual enemy creature.

Next, the outlines of the configuration and operation of the personal computer 20 will be described.

The personal computer 20 is a general-purpose information processing apparatus including an input device, a display device, a processor, an internal storage device, a main memory, and a communication device. A web browser is installed in the personal computer 20. The web browser accesses the web server 40, and displays a content (web page) provided by the web server 40.

Next, the outlines of the configuration and operation of the player information management server 30 will be described.

Figure 4:
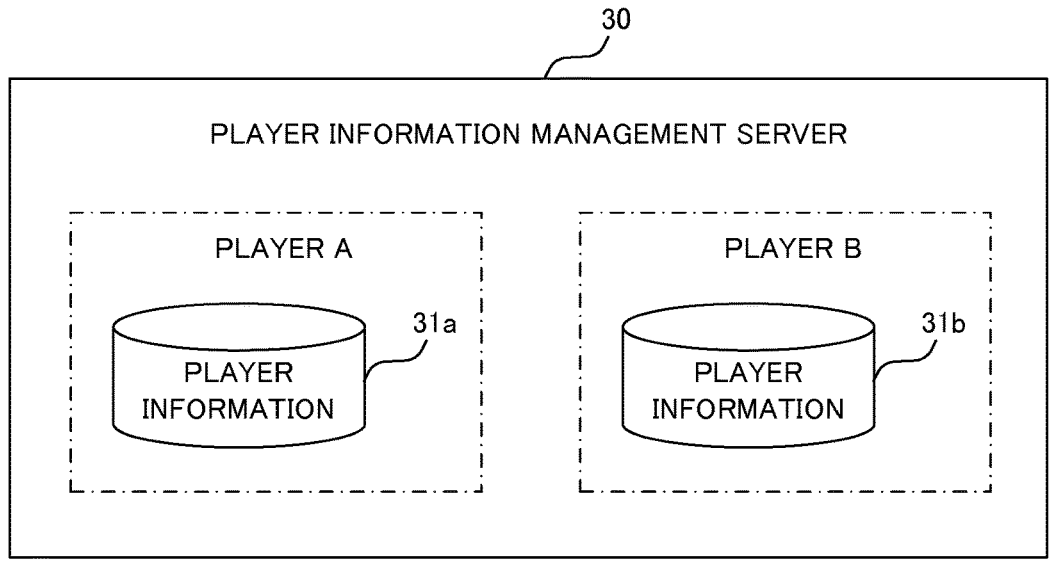
FIG. 4 is a diagram illustrating a non-limiting example of a configuration of information stored in a player information management server.

The player information management server 30 is a server apparatus which manages player information relating to the player of the game apparatus 10. The player information management server 30 is typically a general-purpose information processing apparatus including a processor, an internal storage device, a main memory, and a communication device. As shown in FIG. 4, the player information management server 30 stores, for each user, player information (player information 31a and player information 31b) uploaded from the game apparatus 10. Then, the player information management server 30 transmits the player information to the web server 40 in response to a request from the web server 40.

Next, the outlines of the configuration and operation of the web server 40 will be described.

Figure 5:
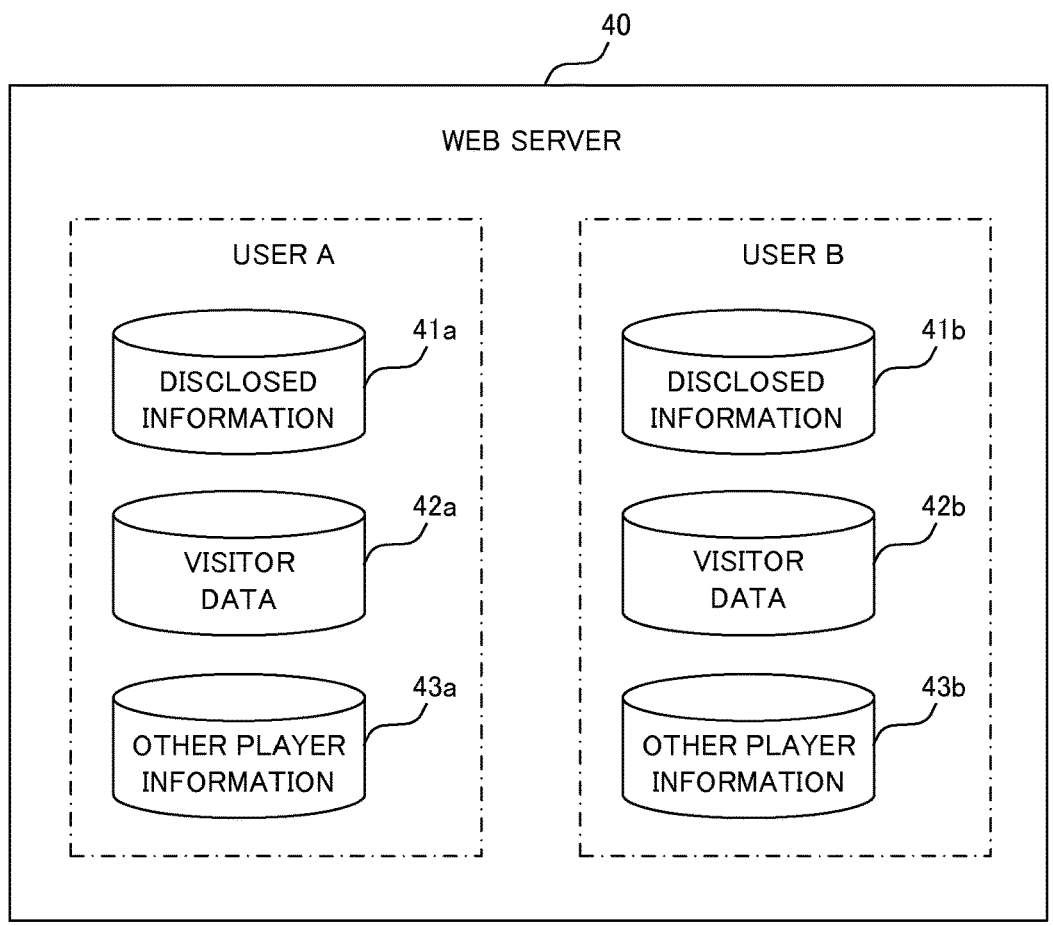
FIG. 5 is a diagram illustrating a non-limiting example of information stored in a web server.

The web server 40 is a server apparatus which provides a web image (web page) in response to an access request from the web browser of the personal computer 20. The web server 40 is typically a general-purpose information processing apparatus including a processor, an internal storage device, a main memory, and a communication device. As shown in FIG. 5, the web server 40 stores, for each user, disclosed information (disclosed information 41a and disclosed information 41b) to be provided to the web browser, visitor data (visitor data 42a and visitor data 42b) relating to a visitor (i.e., another user) who has accessed the disclosed information, and another player information (another player information 43a and another player information 43b) to be downloaded to the game apparatus 10. The disclosed information is information (such as "home" described later) which is created for each user, and is disclosed to the another user via the web browser. The another player information is information relating to the another user who has accessed the disclosed information, and is obtained from the player information management server 30.

Figure 6:
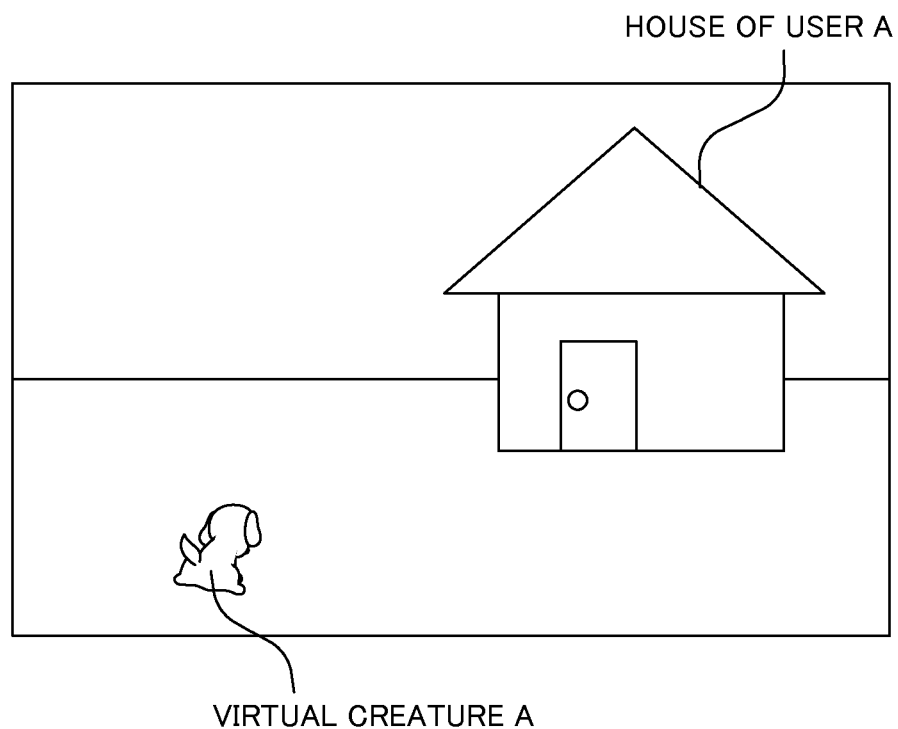
FIG. 6 is a diagram illustrating a non-limiting example of a web image.

When the user A accesses the web server 40 via the web browser of the personal computer 20a and performs new user registration, a "home" of the user A is generated on the web server 40. On the web browser, the "home" of the user A is displayed as a house arranged in a virtual world (hereinafter, referred to as "web world") as shown in FIG. 6. The web world is a virtual world different from the game world of the game executed on the game apparatus 10. In the web world, "homes" of a plurality of users are present. The user A operates a virtual creature in the web world by using the input device (mouse, keyboard, or the like) of the personal computer 20a, and thereby the user A can grow crops in a yard around his/her house, redecorate his/her house, access (visit) a "home" of another user to water a yard of the another user, or enter a house of another user to check the profile of the another user.

When the user A plays the game as shown in FIG. 3 on the game apparatus 10 and uploads the player information to the player information management server 30, the content of the game can be reflected into the web world. For example, a virtual friend creature (e.g., the virtual creature A in FIG. 3) owned by the player character in the game can be caused to appear in the web world, and operated in the web world. Further, the scoring record of the player character in the game world can be disclosed to other users in the web world. This operation is realized by that the web server 40 obtains the player information from the player information management server 30.

Figure 7:
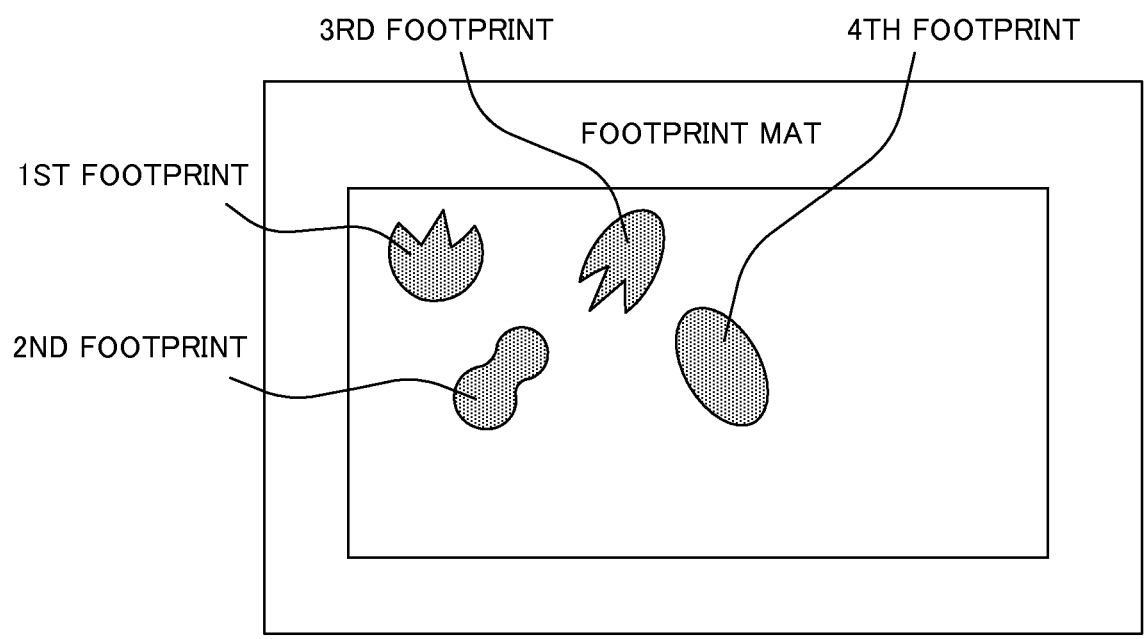
FIG. 7 is a diagram illustrating a non-limiting example of a web image.
Figure 8:
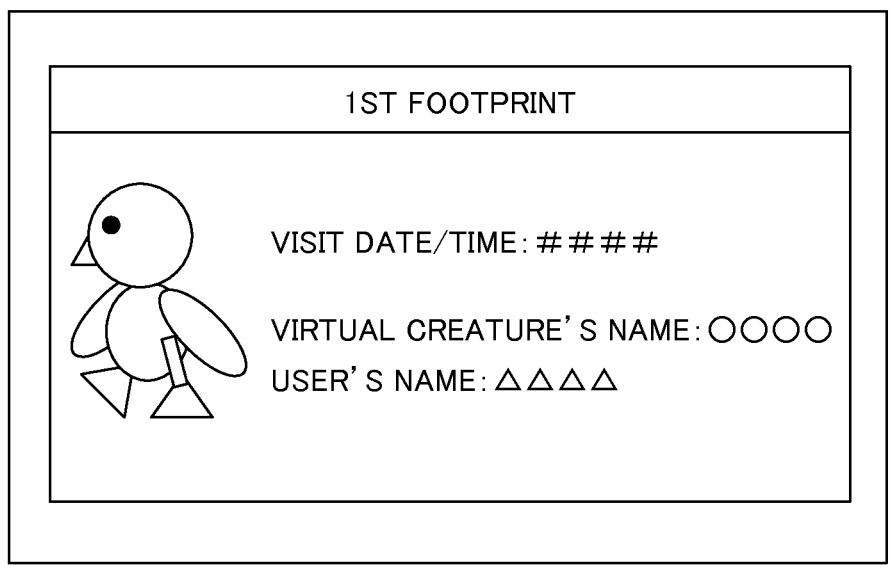
FIG. 8 is a diagram illustrating a non-limiting example of a web image.

When another user accesses the "home" of the user A (i.e., when a virtual creature operated by the another user visits the house of the user A), a footprint of the virtual creature having visited the house of the user A is left on a footprint mat in the "home" of the user A. The user A can check the footprint mat any time in the "home" of the user A. In the example of FIG. 7, four footprints (first to fourth footprints) are left on the footprint mat. The user A can select a desired footprint from these footprints to check the information relating to the footprint. For example, when the user A selects the first footprint, the visit date and time, the appearance and name (or nickname) of the virtual creature having left the footprint, the name (or nickname) of the user having operated the virtual creature, are displayed as shown in FIG. 8.

Figure 9:
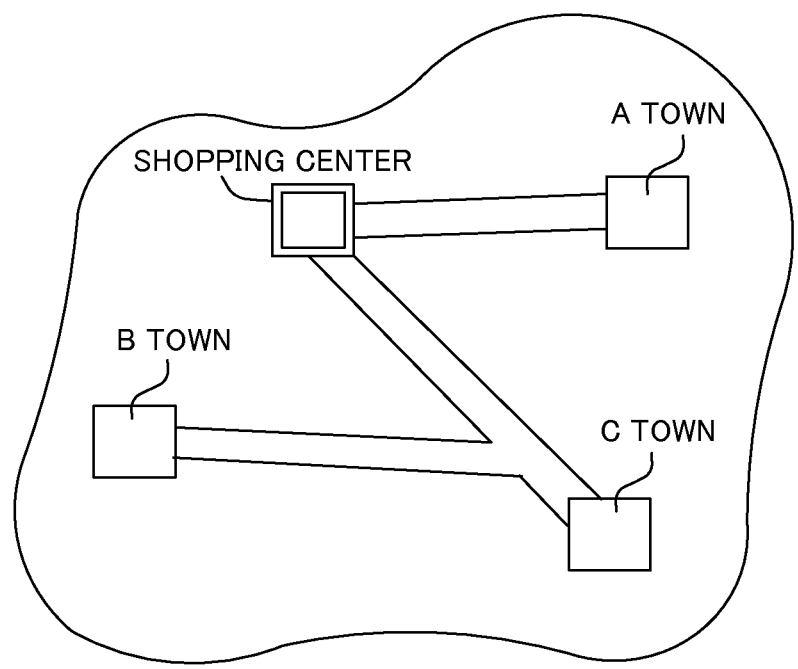
FIG. 9 is a diagram illustrating a non-limiting example of a state of a game world.
Figure 10:
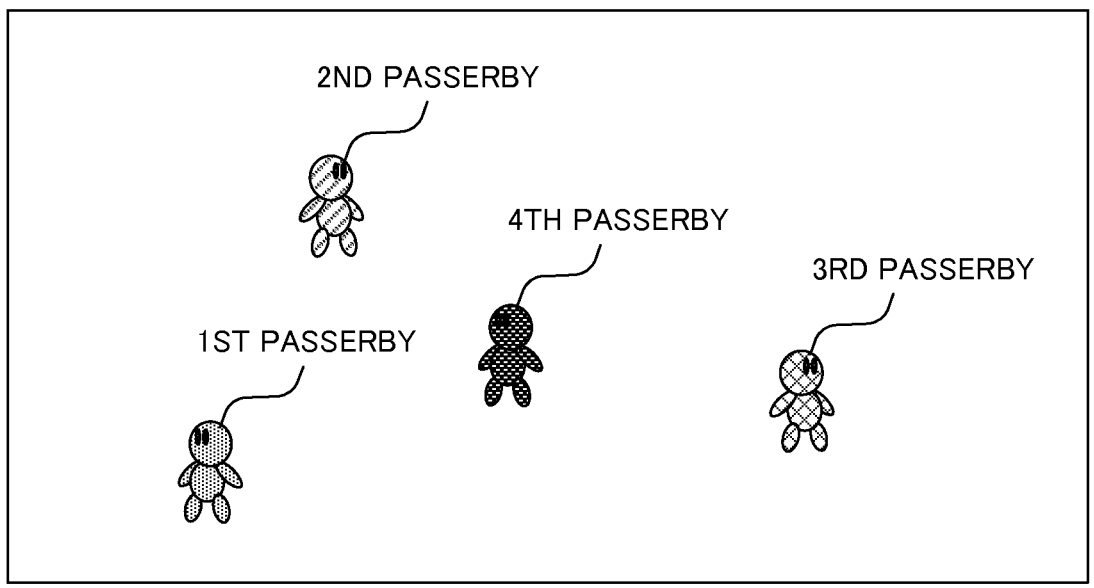
FIG. 10 is a diagram illustrating a non-limiting example of a state of a shopping center in the game world.

When the footprints are left on the footprint mat in the "home" of the player A in the web world as described above, a change occurs in the game world of the game executed on the game apparatus 10a. Specifically, a shopping center and a plurality of towns are arranged in the game world of the game executed on the game apparatus 10a, as shown in FIG. 9. When the footprints are left on the footprint mat in the "home" of the player A in the web world as described above, first to fourth passersby corresponding to the first to fourth footprints appear in the shopping center, as shown in FIG. 10. The first to fourth passersby represent the owners of the virtual creatures having left the first to fourth footprints (i.e., the player characters of other players who own the virtual creatures), respectively. In the appearance of each passerby, an appearance set in the game by the another user corresponding to the passerby is reflected.

Figure 11:
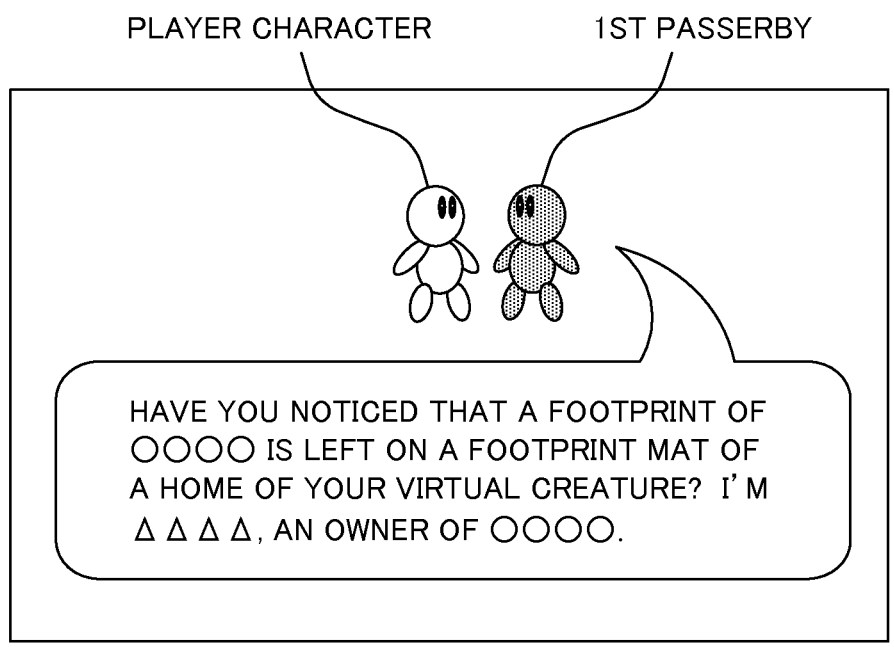
FIG. 11 is a diagram illustrating a non-limiting example of a game image.

When the player character talks to the first passerby according to an operation performed by the player A, the first passerby explains that he/she is the owner of the virtual creature having left the footprint on the footprint mat in the "home" of the player A in the web world, as shown in FIG. 11. In FIG. 11, the name of the virtual creature shown in FIG. 8 is displayed in "○○○○", and the name of the another user shown in FIG. 8 is displayed in "ΔΔΔΔ".

Next, the operation of the game apparatus 10 will be described in detail with reference to FIGS. 12 and 13.

Figure 12:
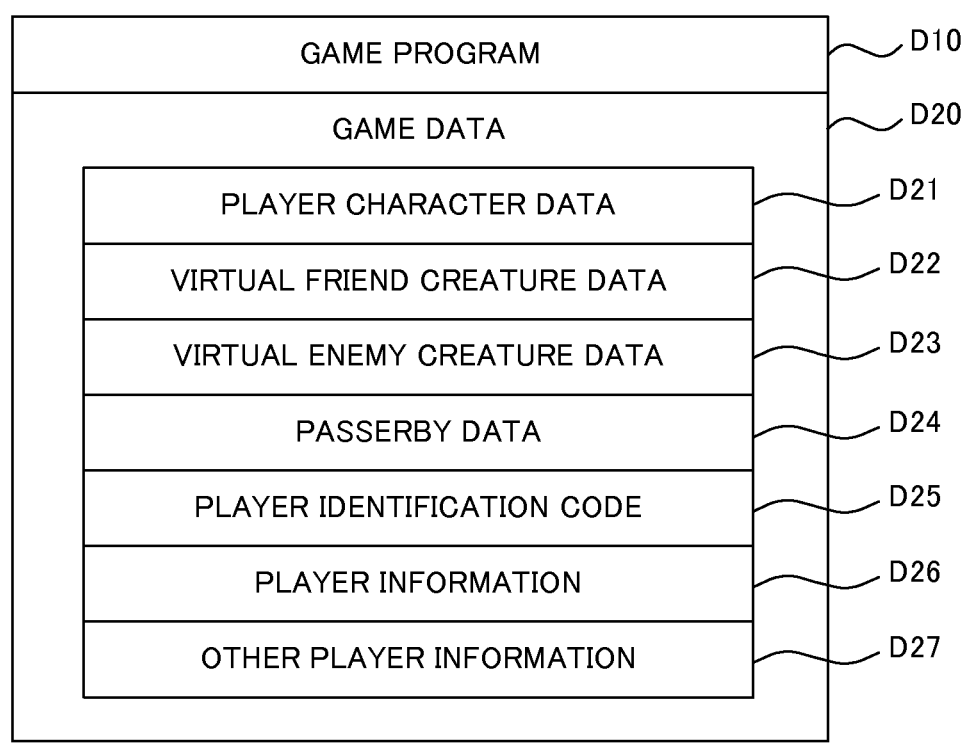
FIG. 12 is a diagram illustrating non-limiting examples of a computer program and data stored in a main memory.

FIG. 12 shows examples of a computer program and data stored in the main memory 15 of the game apparatus 10.

A game program D10 is a computer program for causing the processor 13 to execute the above-described game. The game program D10 is read from the internal storage device 14 or an external storage device (e.g., a game cartridge) which is not shown, and loaded into the main memory 15. The game program D10 may be received from another game apparatus or the server apparatus via the communication device 16, and loaded into the main memory 15.

Game data D20 is data utilized when executing the game program D10. The game data D20 includes player character data D21, virtual friend creature data D22, virtual enemy creature data D23, passerby data D24, player identification code D25, player information D26, other player information D27, and the like.

The player character data D21 relates to the player character in the game world, and includes data indicating the name of the player character, data indicating the appearance of the player character, data indicating the position of the player character in the game world, and the like.

The virtual friend creature data D22 relates to the virtual friend creature owned by the player character, and includes data indicating the type of the virtual friend creature owned by the player character, parameters indicating various abilities of the virtual friend creature (e.g., level, physical strength, offensive power, defensive power, quickness, etc.), and the like.

The virtual enemy creature data D23 relates to the virtual enemy creature, and includes parameters indicating various abilities of the virtual enemy creature (e.g., level, physical strength, offensive power, defensive power, quickness, etc.) and the like.

The passerby data D24 relates to the above-described passersby, and includes data indicating the position of each passerby who appears in the shopping center, data indicating the name of each passerby, data indicating the appearance of each passerby, and the like.

The player identification code D25 is a code (e.g., 10-digit alphanumeric characters) for uniquely identifying the user (player) of the game apparatus 10.

The player information D26 is information to be uploaded to the player information management server 30. The player information D26 includes the name (or nickname) of the user (or the player character), the appearance of the player character, the scoring record of the player character, the name (or nickname) of the virtual creature owned by the player character, the abilities and/or characteristics of the virtual creature, and the like.

The other player information D27 is player information of other player(s), which is downloaded from the web server 40.

Figure 13:
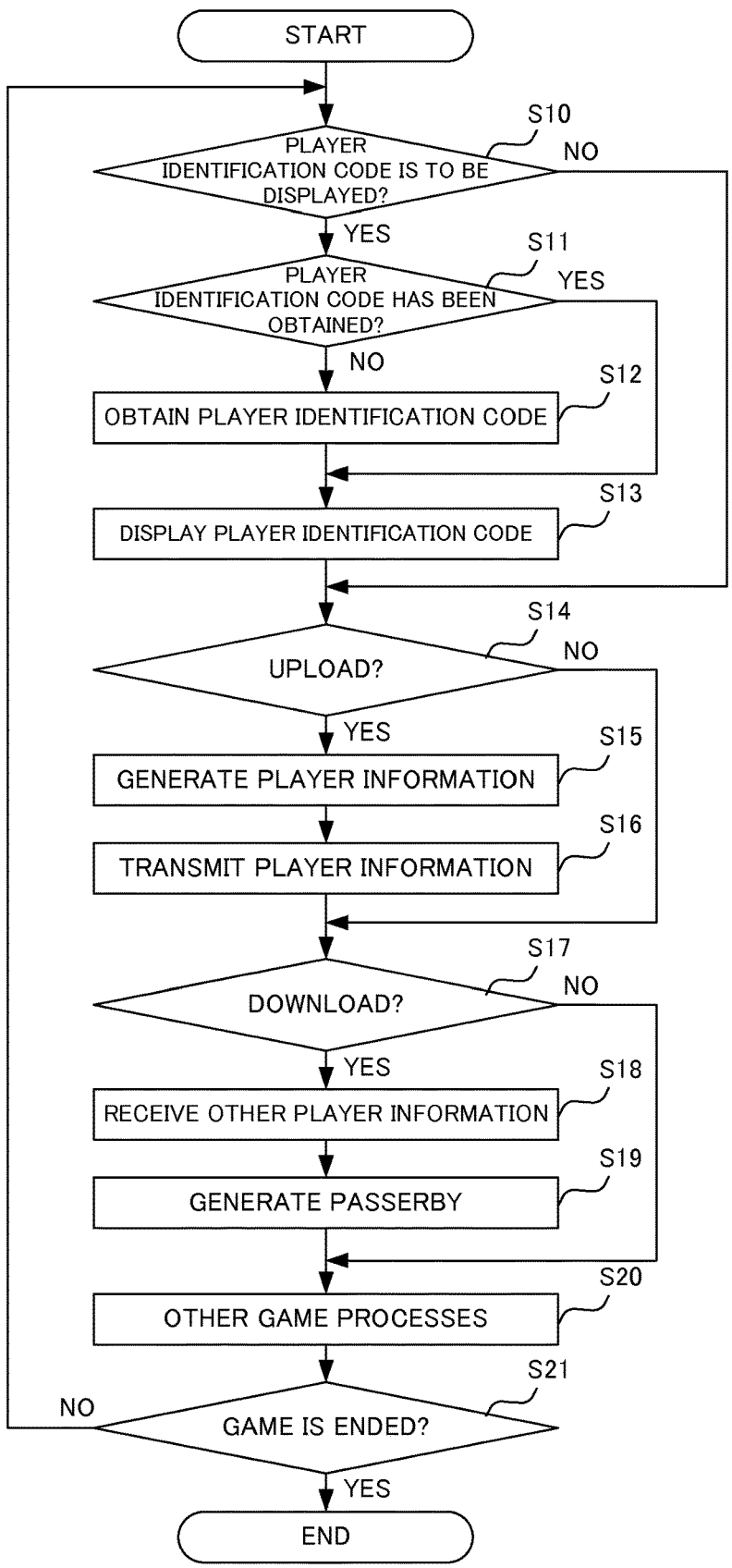
FIG. 13 is a flowchart illustrating a non-limiting example of a procedure of processing executed in the game apparatus.

The following will describe a procedure of processing executed by the processor 13 of the game apparatus 10 based on the game program D10, with reference to the flowchart of FIG. 13.

When execution of the game program D10 is started, firstly, in step S10 in FIG. 13, the processor 13 determines whether an instruction to display the player identification code D25 has been inputted, based on an input from the input device 11. Upon determining that the instruction to display the player identification code D25 has been inputted, the process goes to step S11, and otherwise, the process goes to step S14.

In step S11, the processor 13 determines whether the player identification code D25 has been obtained from the player information management server 30. Upon determining that the player identification code D25 has been obtained, the process goes to step S13, and otherwise, the process goes to step S12.

In step S12, the processor 13 transmits a request for the player identification code D25, to the player information management server 30 via the communication device 16, and obtains the player identification code D25 from the player information management server 30. Thus obtained player identification code D25 is stored in the internal storage device 14 or the like in a non-volatile manner.

In step S13, the processor 13 displays the player identification code D25 on the display device 12. The player identification code D25 displayed on the display device 12 is noted down by the user, and is input to the personal computer 20 by the user in step S46 in FIG. 15 described later.

In step S14, the processor 13 determines whether an instruction to upload the player information D26 has been inputted, based on an input from the input device 11. Upon determining that the upload instruction has been inputted, the process goes to step S15, and otherwise, the process goes to step S17. The upload instruction is made by, for example, the user's selecting an item of "upload" in a menu screen that can be called up at any timing during execution of the game, when the user wants to reflect the state of the game world into the web world (e.g., when the user wants to cause the virtual friend creature appearing in the game world to appear in the web world as a character to be operated by the user).

In step S15, the processor 13 generates the player information D26 to be uploaded to the player information management server 30.

In step S16, the processor 13 transmits the player information D26 to the player information management server 30 via the communication device 16. At this time, in order to specify the player, the player identification code D25 is transmitted to the player information management server 30.

In step S17, the processor 13 determines whether an instruction to download the other player information D27 has been inputted, based on an input from the input device 11. Upon determining that the download instruction has been inputted, the process goes to step S18, and otherwise, the process goes to step S20. The download instruction is made by, for example, the user's selecting an item of "download" in the menu screen that can be called up at any timing during execution of the game, when the user wants to reflect the state of the web world into the game world (e.g., when the user wants to cause a passerby corresponding to another player who has accessed the user's "home" in the web world to appear in the shopping center in the game world).

In step S18, the processor 13 transmits the player identification code D25 to the web server 40 in order to specify the player, and receives the corresponding other player information D27 from the web server 40.

In step S19, the processor 13 causes a new passerby to appear in the shopping center in the game world (i.e., updates the passerby data D24), based on the received other player information D27.

In step S20, the processor 13 performs other game processes. Specifically, the processor 13 performs: a process of controlling the player character, based on an input from the input device 11; a process of causing the virtual friend creature and the virtual enemy creature to fight, based on an input from the input device 11; and a process of generating a game image based on the game data D20. These processes are general game processes, and therefore, are not described in detail here.

In step S21, the processor 13 determines whether the game is ended. Upon determining that the game is ended, the processor 13 ends the execution of the game program D10. Otherwise, the process returns to step S10, and the above-described series of process steps are repeated.

The following will describe a procedure of processing executed by the processor of the player information management server 30 (hereinafter, simply referred to as "processor") based on a player information management program, with reference to the flowchart of FIG. 14.

Figure 14:
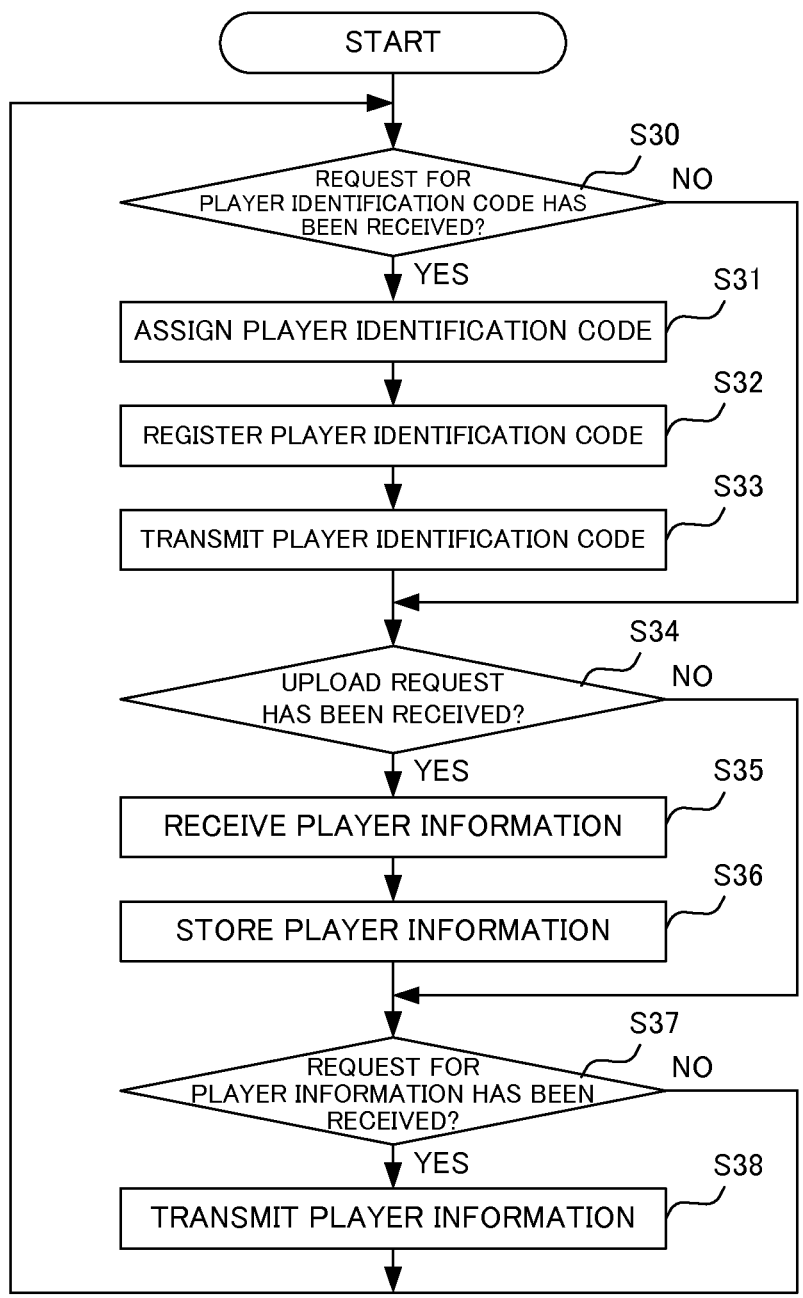
FIG. 14 is a flowchart illustrating a non-limiting example of a procedure of processing executed in the player information management server.

When execution of the player information management program is started, firstly, in step S30 in FIG. 14, the processor determines whether a request for a player identification code has been received from the game apparatus 10. Upon determining that a request for a player identification code has been received, the process goes to step S31, and otherwise, the process goes to step S34.

In step S31, the processor assigns a player identification code D25 that is unregistered in the player information management server 30, to the player of the game apparatus 10 having transmitted the request for a player identification code.

In step S32, the processor registers the assigned player identification code D25 in the player information management server 30.

In step S33, the processor transmits the assigned player identification code D25, to the game apparatus 10 having transmitted the request for a player identification code.

In step S34, the processor determines whether an upload request has been received from the game apparatus 10. Upon determining that an upload request has been received, the process goes to step S35, and otherwise, the process goes to step S37.

In step S35, the processor receives the player information D26 from the game apparatus 10 having transmitted the upload request. At this time, the processor also receives the player identification code D25 from the game apparatus 10.

In step S36, the processor stores the received player information D26 in association with the received player identification code D25 (i.e., as the player information D26 of the player corresponding to the received player identification code D25).

In step S37, the processor determines whether a request for player information has been received from the web server 40. Upon determining that a request for player information has been received, the process goes to step S38, and otherwise, the process returns to step S30.

In step S38, the processor transmits, to the web server 40, the player information D26 of the player requested by the web server 40.

When the process in step S38 is ended, the process returns to step S30.

The following will describe a procedure of processing executed by the processor of the personal computer 20 (hereinafter, simply referred to as "processor") based on an instruction of the user to the web browser, with reference to the flowchart of FIG. 15.

Figure 15:
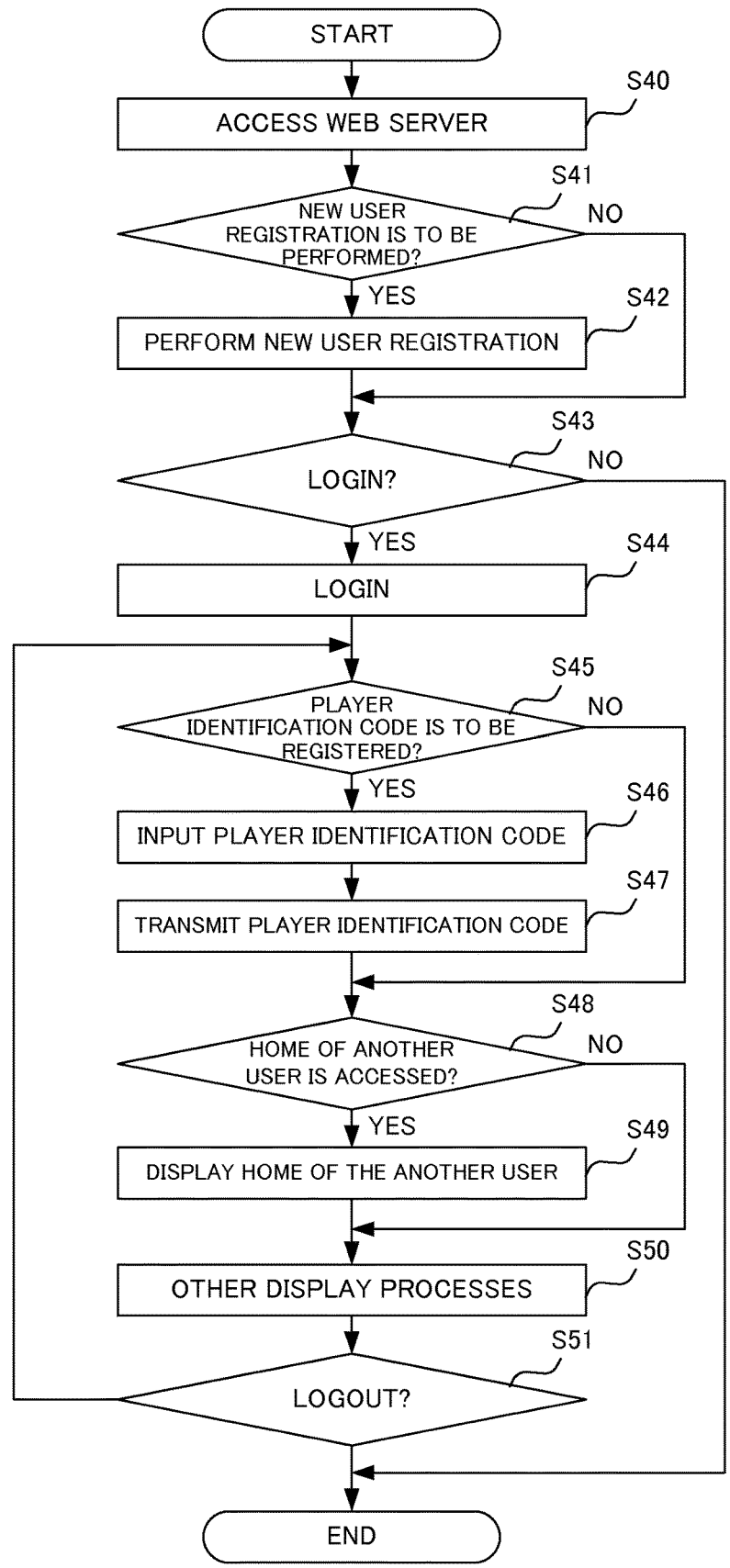
FIG. 15 is a flowchart illustrating a non-limiting example of a procedure of processing executed in a personal computer.

When the web browser is started in the personal computer 20, firstly, in step S40 in FIG. 15, the processor accesses the web server 40 based on an address inputted by the user.

In step S41, the processor determines whether an instruction for new user registration is inputted by the user, based on an input from the input device. Upon determining that an instruction for new user registration is inputted, the process goes to step S42, and otherwise, the process goes to step S43.

In step S42, based on an input from the input device, the processor transmits predetermined information such as the user's name (or nickname), login password, and the like, to the web server 40, thereby performing new user registration.

In step S43, the processor determines whether a login instruction has been inputted by the user, based on an input from the input device. Upon determining that a login instruction has been inputted, the process goes to step S43, and otherwise, the processing by the web browser is ended.

In step S44, based on an input from the input device, the processor transmits the user's name (or nickname) and login password, to the web server 40, thereby logging into the web server 40.

In step S45, based on an input from the input device, the processor determines whether an instruction for player identification code registration has been inputted by the user. Upon determining that an instruction for player identification code registration has been inputted, the process goes to step S46, and otherwise, the process goes to step S48.

In step S46, the processor causes the user to input a player identification code by using the input device. The player identification code inputted by the user is the player identification code displayed on the display device 12 of the game apparatus 10 in step S13 in FIG. 13.

In step S47, the processor transmits the player identification code inputted by the player, to the web server 40.

In step S48, based on an input from the input device, the processor determines whether the user has accessed a "home" of another user (i.e., whether the virtual creature operated by the user has visited a house of another user in the web world). Upon determining that the user has accessed a "home" of another user, the process goes to step S49, and otherwise, the process goes to step S50.

In step S49, the processor displays the "home" of the another user (i.e., the house of the another user in the web world) on the display device.

In step S50, the processor performs other display processes. Specifically, the processor performs a process of moving a virtual creature based on an input from the input device, and the like.

In step S51, based on an input from the input device, the processor determines whether a logout instruction has been inputted by the user. Upon determining that a logout instruction has been inputted, the processor ends the processing by the web browser, and otherwise, the process returns to step S45.

The following will describe a procedure of processing executed to the processor of the web server 40 (hereinafter, simply referred to as "processor") based on the web program, with reference to the flowchart of FIG. 16.

Figure 16:
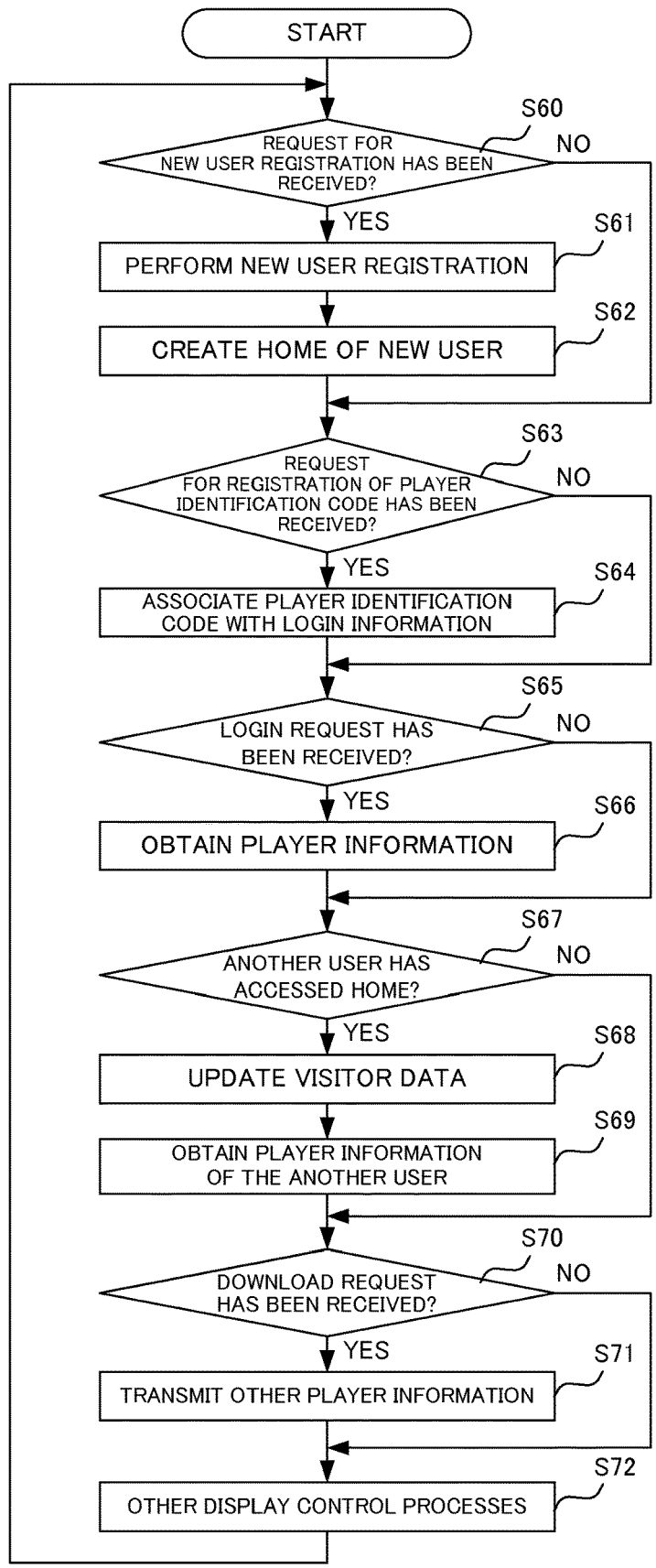
FIG. 16 is a flowchart illustrating a non-limiting example of a procedure of processing executed in the web server.

When execution of the web program is started, firstly, in step S60 in FIG. 16, the processor determines whether a request for new user registration has been received from the personal computer 20. Upon determining that a request for new user registration has been received, the process goes to step S61, and otherwise, the process goes to step S63.

In step S61, the processor registers, in the web server 40, the user's name (or nickname), login password, and the like which have been received from the personal computer 20, thereby performing new user registration.

In step S62, the processor creates a "home" of the new user (the disclosed information 41a shown in FIG. 5, or the like). Thereby, other users are allowed to access the "home" of the new user.

In step S63, the processor determines whether a request for registration of a player identification code has been received from the personal computer 20. Upon determining that a request for registration of a player identification code has been received, the process goes to step S64, and otherwise, the process goes to step S65.

In step S64, the processor stores the player identification code received from the personal computer 20 in association with login information. The login information is information for uniquely identifying a user of a service provided by the web server 40. For example, the login information is the user's name (or nickname) and login password, which need to be inputted at the time of login. Although the game executed by the game apparatus 10 and the web service provided by the web server 40 are essentially independent of each other, the process in step S64 makes it possible to associate the player of the game executed by the game apparatus 10 with the user of the web service provided by the web server 40.

In step S65, the processor determines whether a login request has been received from the personal computer 20. Upon determining that a login request has been received, the process goes to step S66, and otherwise, the process goes to step S67.

In step S66, the processor obtains player information corresponding to the logged-in user from the player information management server 30. Specifically, the processor transmits a player identification code associated with the logged-in user to the player information management server 30, and receives player information corresponding to the player identification code from the player information management server 30. Thereby, it is possible to provide a web service in accordance with the player information of the logged-in user. For example, a virtual friend creature owned by the logged-in user in the game executed by the game apparatus 10 appears in the web world, and the logged-in user can operate the virtual creature in the web world.

In step S67, the processor determines whether another user has accessed a "home" of a certain user. Upon determining that another user has accessed the "home", the process goes to step S68, and otherwise, the process goes to step S70.

In step S68, the processor updates the visitor data (the visitor data 42*a* shown in FIG. 5, or the like) of the user whose "home" has been accessed by the another user.

In step S69, the processor obtains player information of the another user who has accessed the "home", from the player information management server 30. Specifically, the processor transmits a player identification code associated with the another user who has accessed the "home" to the player information management server 30, and receives player information corresponding to the player identification code from the player information management server 30. Then, the processor stores the received player information as other player information (the other player information 43*a* shown in FIG. 5, or the like) of the user whose "home" has been accessed by the another user. In step S69, instead of obtaining the player information of the another user from the player information management server 30, the player information of the another user may be used, which has been obtained from the player information management server 30 in step S66 when the another user has logged in.

In step S70, the processor determines whether a download request has been received from the game apparatus 10. Upon determining that a download request has been received, the process goes to step S71, and otherwise, the process goes to step S72.

In step S71, based on the player identification code D25 received from the game apparatus 10 together with the download request, the processor the processor transmits, to the game apparatus 10, other player information of the user corresponding to the player identification code D25 (i.e., the player information of the another user who has accessed the "home" of the user).

In step S72, the processor performs other display control processes. Specifically, the processor performs, in response to a user request transmitted from the personal computer 20, a process of displaying the footprint mat based on the visitor data, a process of displaying the profile of the another user, and the like.

When the process in step S72 is ended, the process returns to step S60.

As described above, according to the present embodiment, a game executed by the game apparatus 10 and a web service provided by the web server 40 can be linked with each other. Specifically, when another user (user B) accesses information disclosed on the web server 40 by a user (user A) of the web service, a character corresponding to the user B appears in a game world of a game that is played by the user A and is independent of the web service. Accordingly, it is possible to give the user a new surprise that the user has not experienced before. Further, it is possible to motivate the player of the game to utilize the web service.

The embodiment described above is merely one embodiment, and various modifications are considered.

For example, in the above embodiment, the user utilizes two independent information processing apparatuses, i.e., an information processing apparatus (game apparatus 10) executing a game program and an information processing apparatus (personal computer 20) utilizing a web service. However, in another embodiment, the user may utilize an information processing apparatus having the function as a game apparatus and the function of a web browser.

In the above embodiment, the player information management server 30 and the web server 40 are provided independently of each other. However, in another embodiment, a server apparatus having the function of the player information management server 30 and the function of the web server 40 may be used.

In the above embodiment, an example has been described in which, when another user accesses information disclosed by a certain user, a character corresponding to the another user appears in a game world of a game played by the certain user. However, the present disclosure is not limited thereto. An arbitrary change may occur in the game played by the certain user. For example, a virtual creature owned by another user, which has visited a house of a certain user in a web world, may appear in a game world of a game played by the certain user. Alternatively, for example, instead of the character corresponding to the another user which appears in the game world, information (profile or the like) of the another user may be simply literally displayed during the game.

In the above embodiment, the player identification code displayed on the display device 12 of the game apparatus 10 is registered in the web server 40 by the user via the personal computer 20 to associate the player of the game with the user of the web service. In another embodiment, the user may register, in the game apparatus 10, login information for utilizing the web service (or arbitrary information with which the user utilizing the web service can be identified) to associate the player of the game with the user of the web server.

In the above embodiment, disclosed information created in the web server 40 is a house in a web world. However, the disclosed information is not limited thereto. For example, the disclosed information may be a home page created for each user (e.g., a web page in which the user's profile, diary, or the like is disclosed).

In the above embodiment, the game apparatus 10 performs upload of the player information D26 in response to an instruction of the player from the input device 11. In another embodiment, upload of the player information D26 may be automatically performed at an appropriate timing. The same applies to download of the another player information D27.

In the above embodiment, the game apparatus 10 and the personal computer 20 are used. However, instead of the game apparatus 10 and the personal computer 20, any information processing apparatus (a hand-held game apparatus, stationary game apparatus, personal digital assistant, mobile phone, laptop computer, desktop computer, etc.) may be used.

In the above embodiment, a game and a web service are linked with each other. However, the present disclosure is not limited thereto. Any application program other than games may be linked with a web service. For example, when another user accesses information disclosed by a certain user, a predetermined function of an application (application essentially independent of the web service) used by the certain user may be made available to the another user. Thereby, the user of the application can be motivated to use the web service.

In the above embodiment, the plurality of processes shown in FIG. 13 are executed by one computer (processor 13). However, in another embodiment, these processes may be executed by a plurality of computers in a shared manner. In still another embodiment, a part or the entirety of these processes may be implemented by a dedicated circuit. The same applies to the plurality of processes shown in each of FIGS. 14 to 16.

Further, in the above embodiment, the plurality of processes shown in FIG. 13 are executed on one information processing apparatus (game apparatus 10). However, in another embodiment, these processes may be executed by a plurality of information processing apparatuses (e.g., the game apparatus 10 and the server apparatus) in a shared manner. The same applies to the plurality of processes shown in each of FIGS. 14 to 16.

What is claimed is:

1. An information processing system, comprising a processor system including at least one processor, the processor system being configured to at least:
   execute an application which is executable on the information processing system without communicating with a server system, the server system storing disclosed information of a user of the information processing system and recording whether or not another user has accessed the disclosed information of the user;
   transmit an identifier identifying the user of the information processing system to the server system, so that the server system determines whether said another user has accessed the disclosed information of the user identified by the identifier;
   obtain, from the server system, information of said another user, upon determination by the server system that said another user has accessed the disclosed information of the user, and
   add a change to the execution of the application, based on the obtained information of said another user.

2. The information processing system according to claim 1, the processor system being further configured to:
   associate a user of the executed application with the user who provides the disclosed information on the server system.

3. The information processing system according to claim 2, the processor system being further configured to:
   display a user identification code for identifying the user of the executed application,
   cause the user of the information processing system to input the displayed user identification code.

4. The information processing system according to claim 1, wherein
   the obtainment of the information of said another user is performed during the execution of the application.

5. The information processing system according to claim 1, the processor system being further configured to
   display an object corresponding to said another user, based on the obtained information of said another user.

6. The information processing system according to claim 1, wherein
   the server system stores, for each of users of information processing systems, disclosed information of the respective user and information of another user who has accessed the disclosed information.

7. The information processing system according to claim 1, wherein
   the obtained information of said another user includes at least one of information for identifying said another user and information for identifying an object owned by said another user.

8. The information processing system according to claim 1, the processor system being further configured to:
   access the disclosed information of the user of the information processing system and disclosed information of said another user, each disclosed information being present on the server system, and display the disclosed information.

9. The information processing system according to claim 8, wherein
   the information processing system includes a first information processing apparatus and a second information processing apparatus,
   the first information processing apparatus performs the execution of the application and the obtainment of information of said another user, and
   the second information processing apparatus performs the access of the disclosed information of the user of the first information processing system and the disclosed information of said another user.

10. The information processing system according to claim 1, wherein the application is a game program, and the application is executed to generate a game world.

11. The information processing system according to claim 10, wherein the change to the execution of the application is displaying an object in the game world corresponding to said another user.

12. The information processing system according to claim 1, wherein the disclosed information of the user of the information processing system is information created for the user upon registration of the user and disclosed to said another user via a web browser.

13. An information processing apparatus, comprising:
   a processor configured to execute an application that is executable on the information processing system without communicating with a server system, the server system storing disclosed information of a user of the information processing system and recording whether or not another user has accessed the disclosed information of the user;
   a transmitter configured to transmit an identifier identifying the user of the information processing system to the server system, so that the server system determines whether said another user has accessed the disclosed information of the user identified by the identifier; and
   a receiver configured to obtain, from the server system, information of said another user, upon determination by the server system that said another user has accessed the disclosed information of the user, wherein
   the processor adds a change to the execution of the application, based on the information of said another user which is obtained by the receiver.

14. The information processing apparatus according to claim 13, wherein the application is a game program, and the application is executed to generate a game world.

15. The information processing apparatus according to claim 14, wherein the change to the execution of the application is displaying an object in the game world corresponding to said another user.

16. An information processing method used in an information processing system, comprising:
executing an application that is executable on the information processing system without communicating with a server system, the server system storing disclosed information of a user of the information processing system and recording whether or not another user has accessed the disclosed information of the user;
transmitting an identifier identifying the user of the information processing system to the server system, so that the server system determines whether said another user has accessed the disclosed information of the user identified by the identifier; and
executing a process of obtaining, from the server system, information of said another user, upon determination by the server system that said another user has accessed the disclosed information of the user, wherein
in the execution of the application, a change is added to the execution of the application, based on the information of said another user obtained in the other user information obtaining process.

17. The information processing method according to claim 16, wherein the application is a game program, and the application is executed to generate a game world.

18. A non-transitory computer-readable storage medium having stored therein an information processing program for causing a computer of an information processing system to execute:
an application execution process of executing an application that is executable on the information processing system without communicating with a server system, the server system storing disclosed information of a user of the information processing system and recording whether or not another user has accessed the disclosed information of the user;
a process of transmitting an identifier identifying the user of the information processing system to the server system, so that the server system determines whether said another user has accessed the disclosed information of the user identified by the identifier;
a process of obtaining, from the server system, information of said another user, upon determination by the server system that said another user has accessed the disclosed information of the user, wherein
in the application execution process, a change is added to the execution of the application, based on the information of said another user obtained in the other user information obtaining process.

19. The non-transitory computer-readable storage medium according to claim 18, wherein the application is a game program, and the application is executed to generate a game world.

20. A server system, comprising:
a communication device;
a disclosed information storage configured to store disclosed information of a user of an information processing system;
an access information storage configured to store information of another user who has accessed the disclosed information of the user of the information processing system; and
a processor system including at least one processor, the processor system being configured to at least:
transmit, in response to a request from an information processing system of each user, the disclosed information stored in the disclosed information storage, to the information processing system;
receive an identifier identifying the user of the information processing system from the information processing system;
determine whether said another user has accessed the disclosed information of the user identified by the identifier; and
transmit, in response to a request from the information processing system of the user corresponding to any disclosed information stored in the disclosed information storage, the information of said another user, which is stored in the access information storage, to the information processing system of the user.

21. An information processing system, comprising a processing system including at least one processor, the processing system being configured to at least:
execute a game program to generate a game world, the game program being executable on the information processing system independent of a web server, the web server storing disclosed information of a user of the information processing system and recording whether or not another user has accessed the disclosed information of the user;
transmit an identifier identifying the user of the information processing system to the web server, so that the web server determines whether said another user has accessed the disclosed information of the user identified by the identifier in a web world via a web service provided by the web server;
obtain, from the web server, information of another user, upon determination that said another user has accessed the disclosed information of the user, and
add a change to the game world based on the obtained information of said another user.

* * * * *